(12) United States Patent
Nishimura

(10) Patent No.: US 11,796,954 B2
(45) Date of Patent: Oct. 24, 2023

(54) SHEET CUTTING APPARATUS THAT HAS PLURALITY OF CUTTING BLADES THAT CAN MOVE TO CUTTING POSITION AT WHICH SHEET IS CUT AND RETRACTED POSITION AT WHICH SHEET IS NOT CUT AND IMAGE FORMATION

(71) Applicant: CANON KABUSHIKI KAISHA, Tokyo (JP)

(72) Inventor: Yutaka Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/524,826

(22) Filed: Nov. 12, 2021

(65) Prior Publication Data

US 2022/0163916 A1    May 26, 2022

(30) Foreign Application Priority Data

Nov. 20, 2020  (JP) ................................ 2020-193757

(51) Int. Cl.
*G03G 15/00* (2006.01)
*H04N 1/00* (2006.01)

(52) U.S. Cl.
CPC ..... *G03G 15/6582* (2013.01); *H04N 1/00567* (2013.01)

(58) Field of Classification Search
CPC ..... H04H 1/00567; G03G 2215/00814; G03G 15/6582; B26D 7/263; B26D 2011/005; B26D 5/08; H04N 1/00567
See application file for complete search history.

(56) References Cited

U.S. PATENT DOCUMENTS

| | | | | |
|---|---|---|---|---|
| 2011/0283855 | A1* | 11/2011 | Kwarta | B41J 11/68 83/499 |
| 2011/0293351 | A1* | 12/2011 | Kwarta | B26D 1/225 400/621 |
| 2014/0116215 | A1* | 5/2014 | Kwarta | B26D 9/00 83/76.1 |
| 2015/0273720 | A1* | 10/2015 | Endo | B26D 1/245 83/425.1 |
| 2018/0009615 | A1* | 1/2018 | Sakuma | B26D 7/18 |

FOREIGN PATENT DOCUMENTS

JP    2018-052741 A    4/2018

* cited by examiner

*Primary Examiner* — Jennifer Bahls
(74) *Attorney, Agent, or Firm* — Venable LLP

(57) ABSTRACT

A sheet cutting apparatus includes: a cutting unit that includes a plurality of cutting blades for cutting a sheet along a conveyance direction of the sheet, the plurality of cutting blades configured to be able to move to a cutting position and a retracted position; and a control unit. The plurality of cutting blades are provided at different positions in a widthwise direction that is perpendicular to the conveyance direction and a perpendicular direction perpendicular to a surface of the sheet. The control unit is configured to set a first cutting blade to the cutting position or the retracted position by changing a position in the perpendicular direction of the first cutting blade and set a second cutting blade to the cutting position or the retracted position by changing a position in the widthwise direction of the second cutting blade.

9 Claims, 7 Drawing Sheets

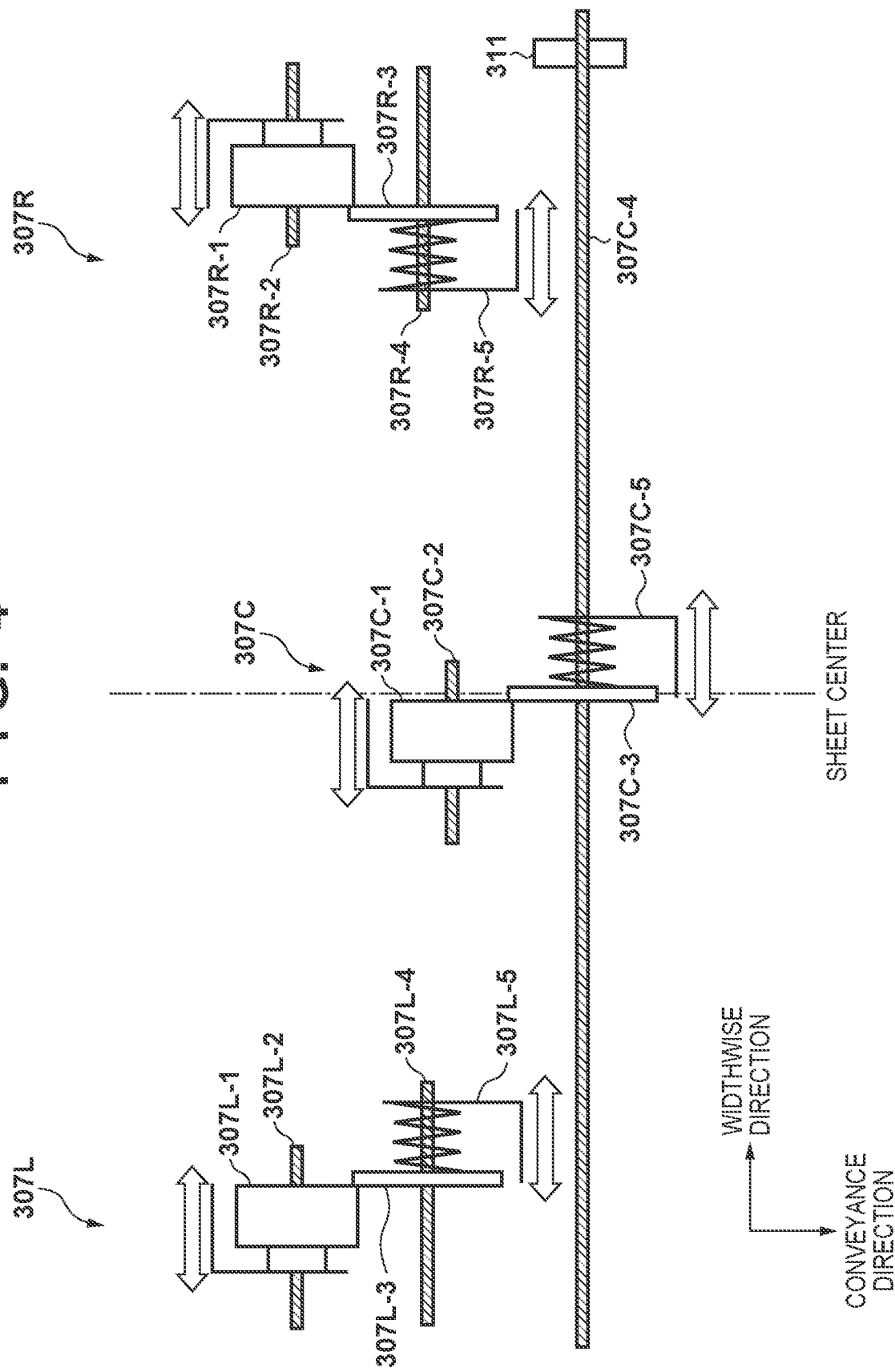

SHEET CUTTING APPARATUS THAT HAS PLURALITY OF CUTTING BLADES THAT CAN MOVE TO CUTTING POSITION AT WHICH SHEET IS CUT AND RETRACTED POSITION AT WHICH SHEET IS NOT CUT AND IMAGE FORMATION

BACKGROUND OF THE INVENTION

Field of the Invention

The present invention relates to a sheet cutting apparatus that has a plurality of cutting blades that can move to a cutting position at which a sheet is cut and a retracted position at which a sheet is not cut and an image formation system that includes the sheet cutting apparatus.

Description of the Related Art

Post-processing apparatuses that perform post-processes of sheets on which an image has been formed by an image formation apparatus, such as a copying machine or a printer, are known. The post-processes include the process of binding sheets, a cutting process of cutting sheets, and the like. Japanese Patent Laid-Open No. 2018-52741 discloses a sheet cutting apparatus that cuts a sheet in its conveyance direction. According to Japanese Patent Laid-Open No. 2018-52741, in order to cut a sheet at different positions in a widthwise direction, three slitter processing units that cut the sheet are provided along the conveyance direction of the sheet. Note that the widthwise direction is a direction that is perpendicular to both the conveyance direction of the sheet and the normal direction of the sheet. The three slitter processing units are configured to be capable of being attached/detached to/from the main body of the apparatus and are exchanged in accordance with the cutting position in the widthwise direction of the sheet.

In the configuration of Japanese Patent Laid-Open No. 2018-52741, the slitter processing units need to be exchanged in accordance with the cutting position in the widthwise direction of the sheet. Further, in the configuration of Japanese Patent Laid-Open No. 2018-52741, a space for mounting the three slitter processing units in series along the conveyance direction of the sheet needs to be provided in the sheet cutting apparatus, thereby increasing the sheet cutting apparatus in size.

SUMMARY OF THE INVENTION

According to an aspect of the present disclosure, a sheet cutting apparatus includes: a conveyance unit configured to convey a sheet; a cutting unit that includes a plurality of cutting blades for cutting the sheet along a conveyance direction of the sheet, the plurality of cutting blades configured to be able to move to a cutting position at which the sheet is cut and a retracted position at which the sheet is not cut; and a control unit configured to control the cutting unit, wherein the plurality of cutting blades are provided at different positions in a widthwise direction that is perpendicular to both the conveyance direction and a perpendicular direction perpendicular to a surface of the sheet, at least one first cutting blade among the plurality of cutting blades is configured to be able to change a position in the perpendicular direction, a second cutting blade that is different from the first cutting blade among the plurality of cutting blades is configured to be able to change a position in the widthwise direction from an inside to an outside of a range in the widthwise direction in which the sheet passes, and the control unit is configured to set the first cutting blade to the cutting position or the retracted position by changing the position in the perpendicular direction of the first cutting blade and set the second cutting blade to the cutting position or the retracted position by changing the position in the widthwise direction of the second cutting blade.

Further features of the present invention will become apparent from the following description of exemplary embodiments with reference to the attached drawings.

BRIEF DESCRIPTION OF THE DRAWINGS

FIG. 4 is a configuration diagram of a second cutting unit.

DESCRIPTION OF THE EMBODIMENTS

Figure 1:
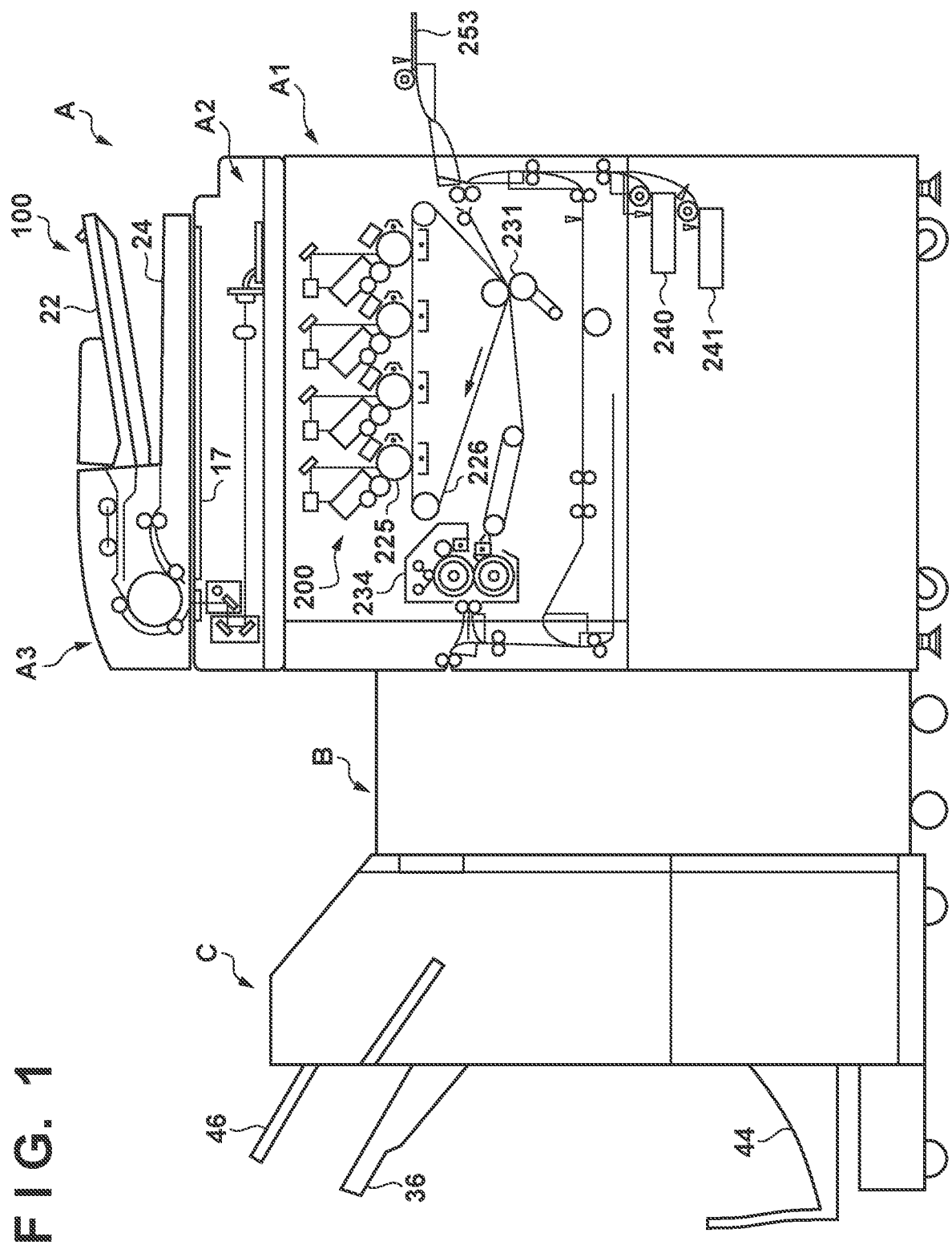
FIG. 1 is a configuration diagram of an image formation system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a configuration diagram of an image formation system 100 according to the present embodiment. The image formation system 100 includes an image formation apparatus A, a sheet cutting apparatus B, and a sheet processing apparatus C. The image formation apparatus A includes an image formation unit A1, a scanner unit A2, and a feeder unit A3.

The image formation unit A1 has an image formation unit 200 for forming yellow, magenta, cyan, and black toner images, respectively. The image formation unit 200 forms yellow, magenta, cyan, and black toner images on four photosensitive bodies 225 by electrophotography. Specifically, each charging device of the image formation unit 200 charges the corresponding photosensitive body 225. Each exposure apparatus of the image formation unit 200 forms an electrostatic latent image on the corresponding photosensitive body 225 by exposing the corresponding photosensitive body 225 to light. Then, each development apparatus of the image formation unit 200 develops an electrostatic latent image on the corresponding photosensitive body 225 with toner and forms a toner image on each photosensitive body 225. The toner image of each photosensitive body 225 is transferred to a transfer belt 226, which is an intermediate transfer member, by each transfer charging device of the image formation unit 200. Note that a full-color toner image can be formed by transferring the toner image of each of the photosensitive bodies 225 onto the transfer belt 226 in a superimposed manner. The transfer belt 226 is driven to rotate in a clockwise direction in the drawing at the time of image formation. Thus, the toner images that have been transferred onto the transfer belt 226 are conveyed to a position that is opposite to a secondary transfer apparatus 231. The secondary transfer apparatus 231 transfers the toner images on the transfer belt 226 onto a sheet that has been conveyed from one of cassettes 240 and 241 and a manual feeding tray 253. A fixing apparatus 234 fixes the toner images onto the sheet by heating and pressurizing the sheet onto which the toner images have been transferred. The image formation unit A1 of the present embodiment is configured so that an image can be formed not only on one side of the sheet but also on both sides of a sheet. However, since image formation on both sides of a sheet is not necessary for the description of the present embodiment, the description thereof will be omitted. In any case, the sheet on which the toner images have been formed by the image formation unit A1 is finally conveyed to the sheet cutting apparatus B.

The feeder unit A3 conveys an original placed on a tray 22 along a conveying path and discharges it onto a tray 24. The scanner unit A2 optically reads the original that has been conveyed by the feeder unit A3 and outputs the read image data to the image formation unit A1. The image formation unit A1 may form an image onto a sheet based on the image data from the scanner unit A2. Further, the scanner unit A2 is configured to read not only the original that the feeder unit A3 has conveyed but also an original that has been placed on a platen 17. The image formation unit A1 can be configured to perform not only image formation based on image data from the scanner unit A2 but also image formation based on image data that has been received from a computer via a network (not illustrated).

The sheet cutting apparatus B performs the cutting process of a conveyed sheet as necessary. The sheet that has passed through the sheet cutting apparatus B is conveyed to the sheet processing apparatus C. The sheet processing apparatus C performs the process of binding and the process of folding sheets as necessary and then discharges the sheets to any one of discharge trays 36, 44, and 46.

Figure 2:
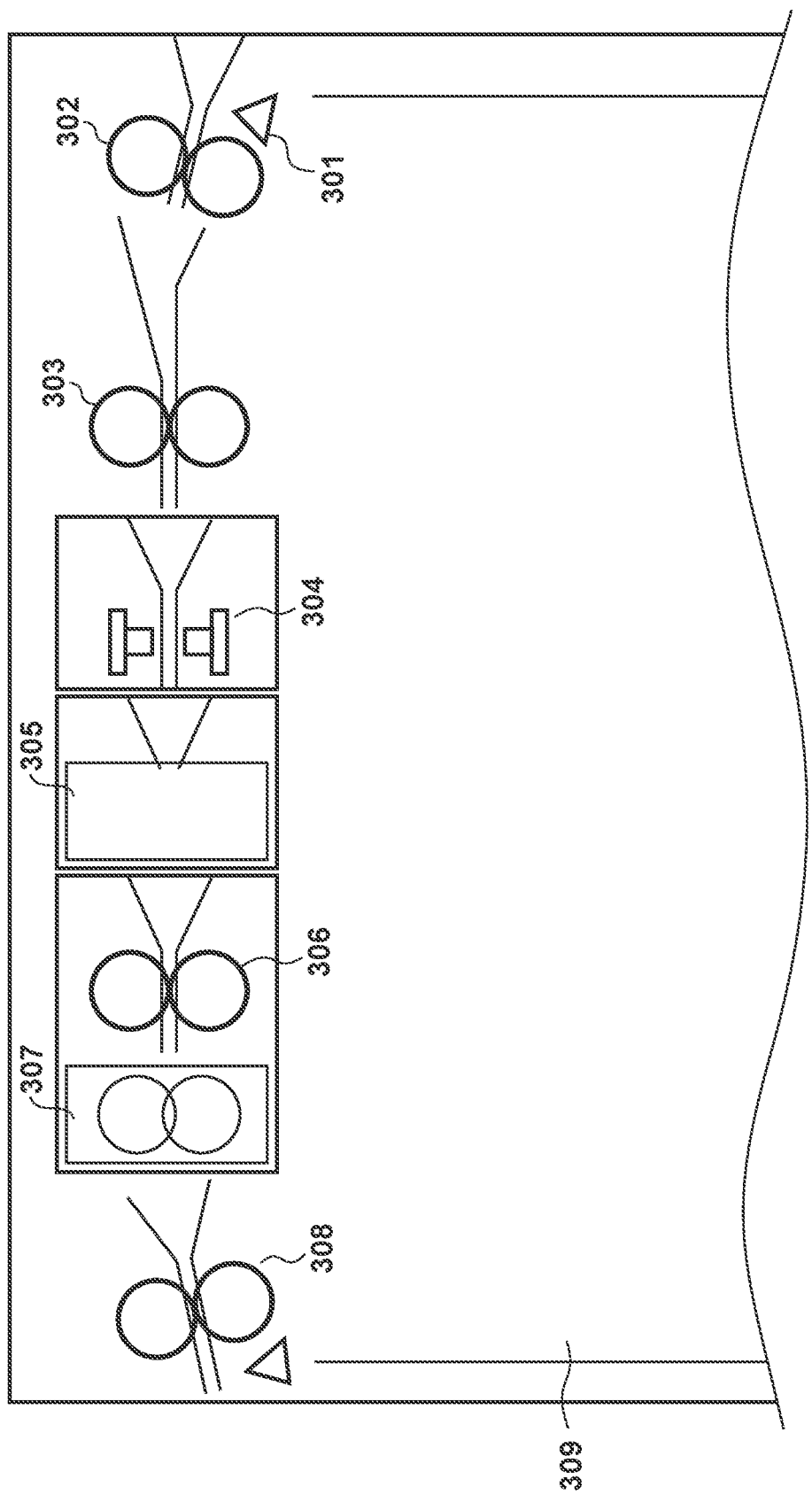
FIG. 2 is a configuration diagram of a sheet cutting apparatus.

FIG. 2 is a configuration diagram of the sheet cutting apparatus B. Inlet rollers 302 feed a sheet from the image formation apparatus A to the sheet cutting apparatus B. Note that, at that time, the rotation of registration rollers 303 is stopped, and the inlet rollers 302 are stopped after the sheet is abutted against the registration rollers 303 that are stopped. As a result, the skew of the sheet is corrected. Note that the timing at which to stop the inlet rollers 302 is determined based on the timing at which an inlet sensor 301 detects the sheet. After the correction of the skew, the sheet is conveyed to a first cutting unit 305 via a detection sensor 304 by the registration rollers 303. The detection sensor 304 detects an end position in the widthwise direction of the sheet. Note that the widthwise direction is a direction that is perpendicular to both the conveyance direction of the sheet and a perpendicular direction (normal direction), which is perpendicular to the surface of the sheet.

Figure 3:
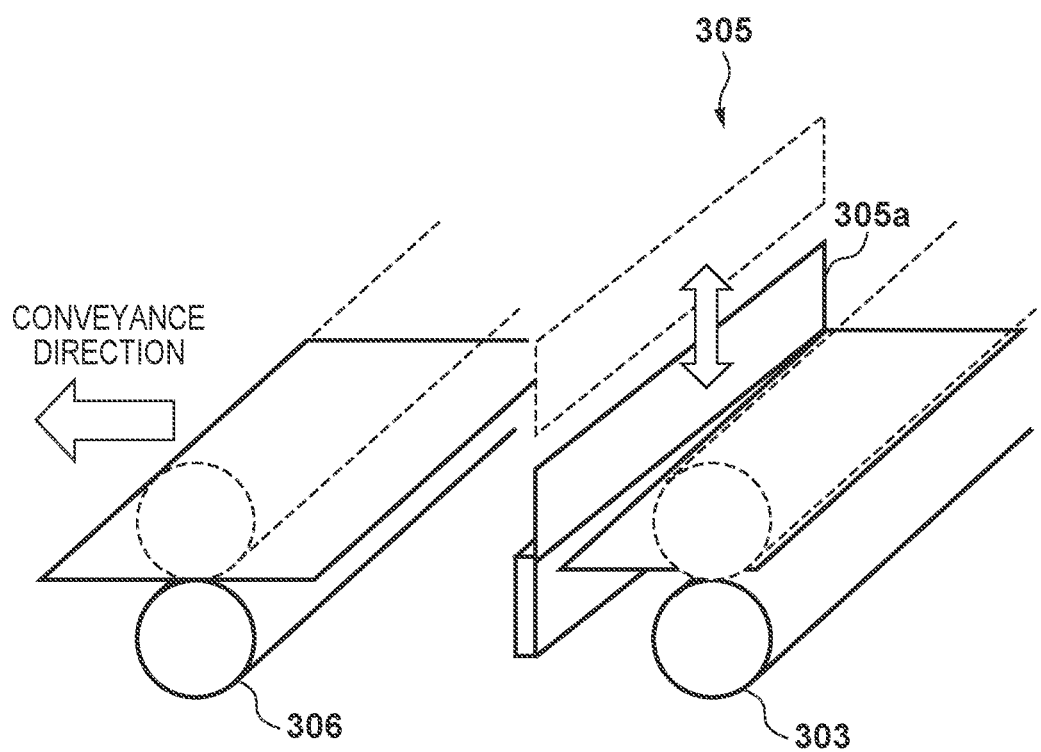
FIG. 3 is a configuration diagram of a first cutting unit.

FIG. 3 is a perspective view of the first cutting unit 305. Note that, in FIG. 3, the detection sensor 304, which is between the registration rollers 303 and the first cutting unit 305, has been omitted in order to simplify the drawing. The first cutting unit 305 includes a guillotine blade 305a that cuts a sheet along the widthwise direction. The sheet is cut by moving the guillotine blade 305a in the perpendicular direction by a drive unit (not illustrated). The position in the conveyance direction at which to cut the sheet is determined by the amount of conveyance of the sheet by the registration rollers 303. Incidentally, when cutting the sheet, the conveyance of the sheet is stopped by stopping the registration rollers 303.

Returning to FIG. 2, the sheet that has passed through the first cutting unit 305 is conveyed to a second cutting unit 307 by intermediate rollers 306. The second cutting unit 307 cuts the sheet along the conveyance direction.

FIG. 4 is a configuration diagram of the second cutting unit 307. In the present embodiment, the second cutting unit 307 includes three cutter units 307L, 307C, and 307R. The cutter unit 307L and the cutter unit 307R are provided near the two ends of the sheet in the widthwise direction, and the cutter unit 307C is provided near the center of the sheet in the widthwise direction. The configurations of the respective cutter units 307L, 307C, and 307R are basically the same, and the configuration of the cutter unit 307L will be described below. The cutter unit 307L has a disc-like cutter blade (cutting blade) 307L-3 that is supported by a shaft 307L-4 and a coma 307L-1 that is supported by a shaft 307L-2. The cutter blade 307L-3 is biased toward the coma 307L-1 by a biasing spring 307L-5. In addition, the cutter unit 307L is configured to be able to move in the widthwise direction by a drive unit (not illustrated). A sheet that is conveyed in the conveyance direction is cut along the conveyance direction by the cutter blade 307L-3, which rotates with the shaft 307L-4 as a rotation shaft. As described above, the cutter blades 307L-3, 307C-3 and 307R-3 are cutting members that cut a sheet along the conveyance direction. Further, as illustrated in FIG. 4, the cutter unit 307C has a cam 311, which is provided outside a region in which a sheet passes in the conveyance direction. Hereinafter, a region in which a sheet passes is referred to as a sheet pass region. As illustrated in FIG. 4, a shaft 307C-4 of the cutter unit 307C extends to a position at which the cam 311 is provided, and the cam 311 is biased to the shaft 307C-4 as will be described later.

Each of the three cutter blades 307L-3, 307C-3 and 307R-3 is configured so it can be set to one of a cutting state in which a sheet is cut or a retracted state in which a sheet is not cut. In the present embodiment, a cutting control unit B1 (see FIG. 7) switches the states of the cutter blades 307L-3 and 307R-3 by moving the cutter units 307L and 307R in the widthwise direction. Specifically, when causing the cutter blades 307L-3 and 307R-3 to enter the cutting state, the cutting control unit B1 moves, in the widthwise direction, the cutter blade 307L-3 and the cutter blade 307R-3 to positions within the sheet pass region. More specifically, the cutting control unit B1 moves the cutter blade 307L-3 and the cutter blade 307R-3 to cutting positions within the sheet pass region in the widthwise direction. Meanwhile, when causing the cutter blades 307L-3 and 307R-3 to enter the retracted state, the cutting control unit B1 moves the cutter blade 307L-3 and the cutter blade 307R-3 to retracted positions that are outside the sheet pass region in the widthwise direction.

Meanwhile, when the configuration for switching the state of the cutter blade 307C-3 is the same as the cutter blades 307L-3 and 307R-3, the distance over which the cutter blade 307C-3 is caused to move in order to switch the state is increased. Therefore, the time required for switching the state of the cutter blade 307C-3 increases, and productivity decreases. Therefore, in the present embodiment, the state of the cutter blade 307C-3 is switched by changing the position in the perpendicular direction of the cutter blade 307C-3.

Figure 5A:
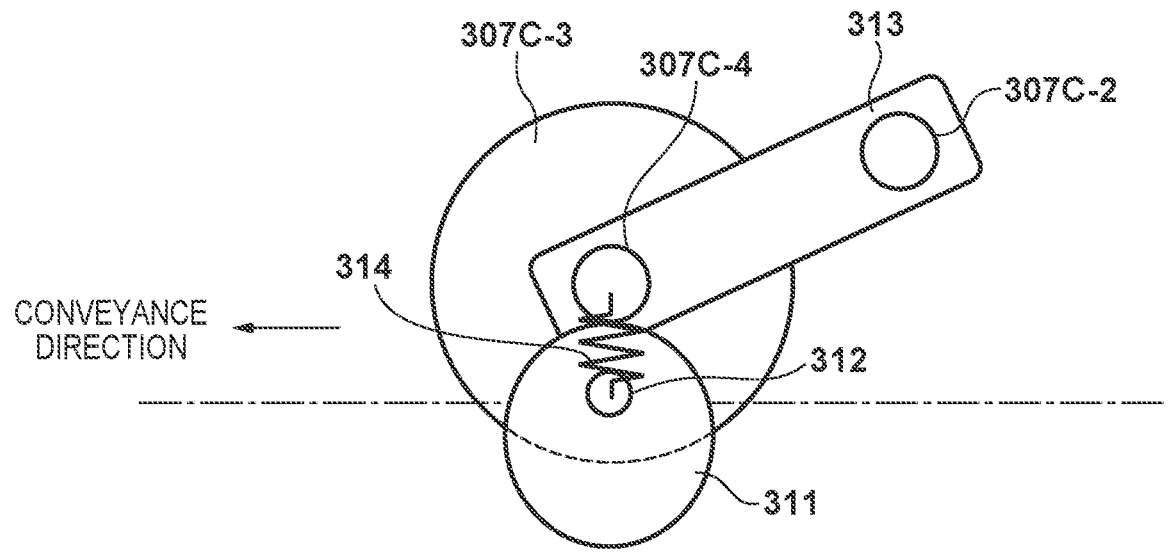
FIG. 5A is a view illustrating a cutter blade in a cutting state.
Figure 5B:
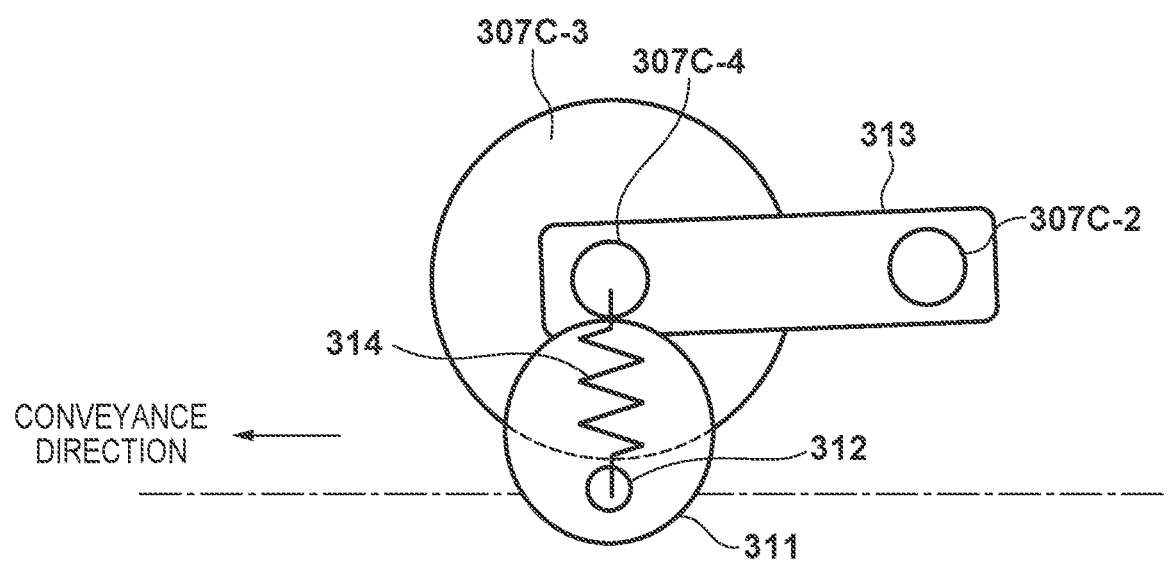
FIG. 5B is a view illustrating a cutter blade in a retracted state.

FIG. 5A illustrates the cutter blade 307C-3 in the cutting state, and FIG. 5B illustrates the cutter blade 307C-3 in the retracted state. Note that dash-dotted lines in FIGS. 5A and 5B indicate a sheet surface. As illustrated in FIGS. 5A and 5B, the shaft 307C-4 of the cutter blade 307C-3 and a shaft 307C-2 of a coma 307C-1 are connected by a link arm 313. Further, the shaft 307C-4 is biased by a tension spring 314 to be in contact with the peripheral surface of the cam 311 that is provided outside the sheet pass region. Further, the cam 311 is configured to be able to rotate with a cam shaft 312 as a rotation shaft. By rotating the cam 311 by a drive unit (not illustrated), the shaft 307C-4 moves in a direction that is away from the sheet surface, and thus the cutter blade 307C-3 also moves away from the sheet surface as illustrated in FIG. 5B.

As illustrated in FIG. 5A, in the case of the cutting state, the cutter blade 307C-3 is set to a position (cutting position) at which it penetrates the sheet surface in a direction that is perpendicular to the sheet surface. Meanwhile, as illustrated in FIG. 5B, in the case of the retracted state, the cutter blade 307C-3 is in a retracted position, which is away from the sheet surface. The retracted position and the cutting position are different from each other in the perpendicular direction. More specifically, the retracted position is a position at which the cutter blade 307C-3 is not in contact with the sheet surface.

Figure 6A:
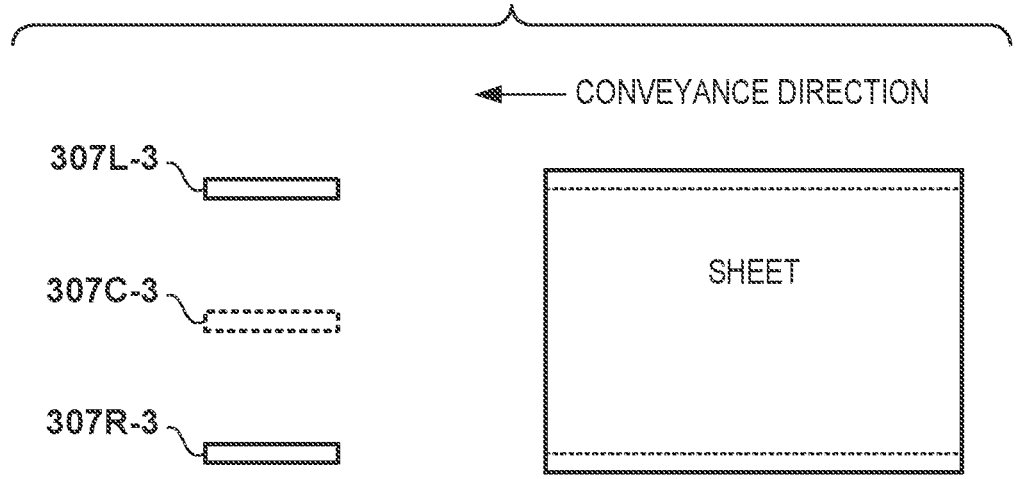
FIGS. 6A and 6B are views describing a cutting process by the second cutting unit.
Figure 6B:
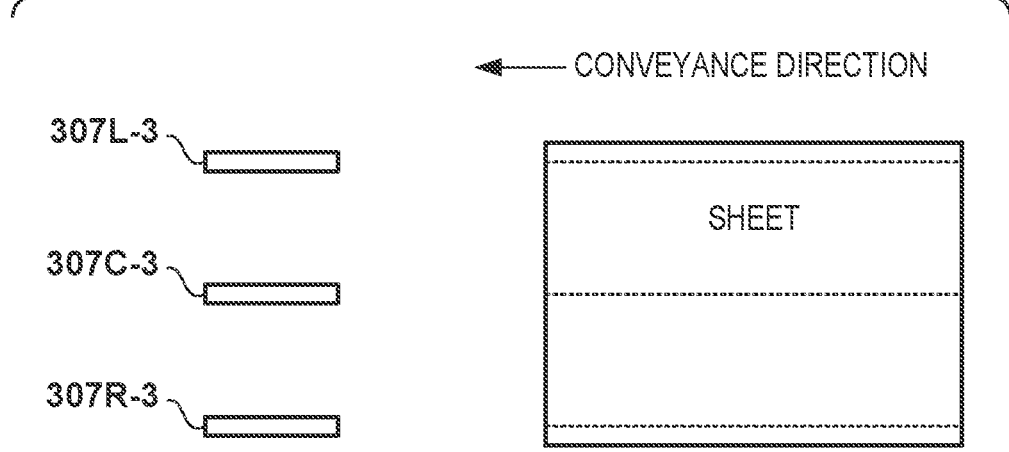

For example, as illustrated in FIG. 6A, it is possible to cut the vicinity of the two widthwise ends of the sheet (indicated by dotted lines) by setting the cutter blades 307L-3 and 307R-3 to the cutting state and setting the cutter blade 307C-3 to the retracted state. Meanwhile, as illustrated in FIG. 6B, it is possible to cut the vicinity of the widthwise center of the sheet in addition to the vicinity of the two widthwise ends of the sheet by setting all of the cutter blades 307L-3, 307C-3 and 307R-3 to the cutting state. Note that each of the cutter blades 307L-3, 307C-3 and 307R-3 is configured to be capable of being individually set to a cutting state or a retracted state.

In the present embodiment, the reason why the cutter blade 307C-3 is also configured to be able to move in the widthwise direction is to adjust the cutting position in the widthwise direction. Meanwhile, the reason why the cutter blades 307L-3 and 307R-3 are configured to be able to move in the widthwise direction is to switch between the cutting state and the retracted state in addition to adjusting the cutting position in the widthwise direction. Therefore, as described above, the cutter blades 307L-3 and 307R-3 are configured to be able to move, in the widthwise direction, in a range from a position within the sheet pass region to a position outside the sheet pass region. Meanwhile, the cutter blade 307C-3 is configured to be able to move in the widthwise direction to the extent that is required in order to adjust the cutting position in the widthwise direction. For example, the widthwise range of movement of the cutter blade 307C-3 may be contained in the widthwise range in which the sheet passes. Instead, the cutter blade 307C-3 switches between the cutting state and the retracted state by being configured to be able to change the position in the perpendicular direction.

As described above, configuring each of the plurality of cutter blades 307L-3, 307C-3 and 307R-3 to be capable of being set to either the retracted state or the cutting state makes it possible to cut a sheet at a widthwise position that accords with the content of the cutting process. This configuration eliminates the need to exchange the cutting members in accordance with the cutting position of the sheet. Further, since it can handle various cutting positions, it eliminates the need to provide a plurality of cutting members in series along the conveyance direction of the sheet, and it is possible to prevent the sheet cutting apparatus from increasing in size. It is noted that the cutting position in the second cutting unit 307 is determined with reference to the two widthwise ends of the sheet that the detection sensor 304 has detected. In addition, in FIG. 2, a reference numeral 308 is rollers for feeding a sheet to the sheet processing apparatus C, and a reference numeral 309 is a scrap box for storing sheet scraps that were generated in the cutting processes in the first cutting unit 305 and the second cutting unit 307.

Figure 7:
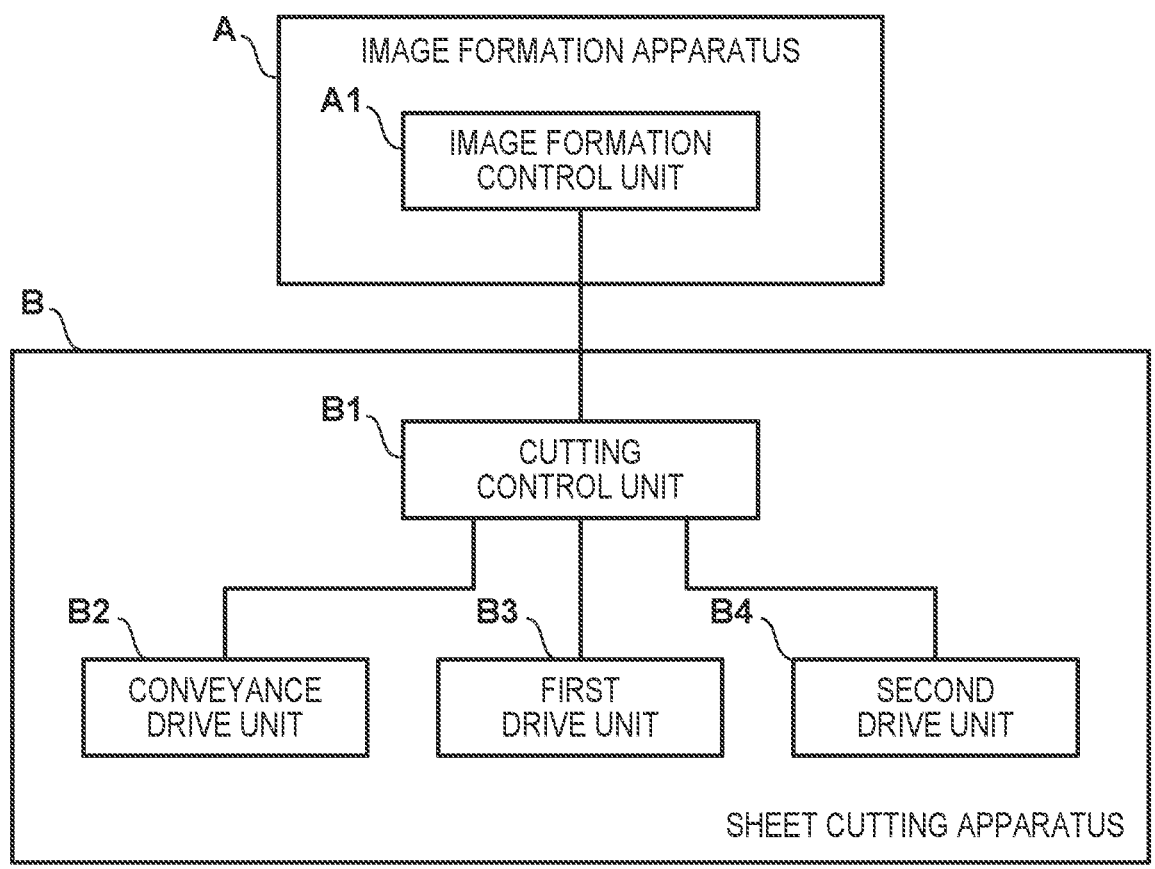
FIG. 7 is a control configuration diagram of the image formation system.

FIG. 7 illustrates a control configuration of the image formation system 100. An image formation control unit A1 controls the entire image formation system 100, and the cutting control unit B1 controls the sheet cutting apparatus B under the control of the image formation control unit A1. Note that the image formation control unit A1 also controls a post-processing apparatus C, but that is omitted in FIG. 7. The cutting control unit B1 controls the conveyance of a sheet in the sheet cutting apparatus B by controlling a conveyance drive unit B2. In addition, the cutting control unit B1 controls cutting of a sheet by the guillotine blade 305a of the first cutting unit 305 by controlling a first drive unit B3. In addition, the cutting control unit B1 controls cutting of a sheet by the second cutting unit 307 by controlling a second drive unit B4. This control includes state setting control (retracted state, cutting state) of the respective cutter blades 307L-3, 307C-3 and 307R-3 and, when setting to the cutting state, includes control that causes a cutter blade to move to the cutting position.

Note that, in the present embodiment, three cutter blades 307L-3, 307C-3 and 307R-3 are provided at different widthwise positions; however, the number of cutter blades that are provided at different widthwise positions is not limited to three. For example, there may be three or more cutter blades. In addition, the number of cutter blades may be two. More generally speaking, a plurality of cutter blades are classified into first cutter blades and second cutter blades. A first cutter blade is a cutter blade whose transition time becomes a predetermined time or more when it is switched from the cutting state to the retracted state by being moved in the widthwise direction. Meanwhile, a second cutter blade is a cutter blade whose transition time is shorter than the predetermined time when it is switched from the cutting state to the retracted state by being moved in the widthwise direction. In this case, regarding the first cutter blade, a switch between the cutting state and the retracted state is performed by changing the perpendicular position of the cutter blade as in the cutter blade 307C-3 described in the embodiment. Regarding the second cutter blade, a switch between the cutting state and the retracted state is performed via widthwise movement as in the cutter blade 307L-3 and 307R-3 described in the embodiment.

Moreover, configuring all the cutter blades to be able to change their perpendicular positions makes a configuration in which the retracted state and the cutting state are switched by changing the perpendicular positions possible. Further, a configuration in which among the plurality of cutter blades the two cutter blades at either widthwise ends switch between the cutting state and the retracted state via widthwise movement and the rest of the cutter blades switches between the cutting state and the retracted state by changing perpendicular positions is possible.

Note that, in the present embodiment, configuration is taken so as to enable widthwise movement also for the first cutter blade in order to adjust the widthwise cutting position; however, it is sufficient so long as the widthwise position can be changed, and there is no need for the moving direction and the widthwise direction to be the same. That is, a direction in which to move the first cutter blade for adjustment of the cutting position can be, for example, parallel to the sheet surface and a direction that intersects the conveyance direction. The same applies to the second cutter blade. However, regarding the second cutter blade, since it is set to the retracted state by changing the widthwise position, it is configured to be able to change the widthwise position from the inside to the outside of the widthwise range in which the sheet passes.

Note that, in the present embodiment, the perpendicular position of the cutter blade 307C-3 is changed by moving the cutter blade 307C-3 with the shaft 307C-2 as a rotation shaft, thereby switching between the retracted state and the cutting state. However, a configuration for changing the perpendicular position of the cutter blade 307C-3, such as moving the cutter blade 307C-3 in the perpendicular direction, is not limited to the configuration of FIGS. 5A and 5B.

As described above, each cutter blade is configured to be capable of being individually set to the retracted state and the cutting state. In addition, regarding a cutter blade for which transition time becomes longer when switching between the retracted state and the cutting state by changing the widthwise position, a configuration is taken such that the perpendicular position of the cutter blade can be changed, and the retracted state and the cutting state are switched by changing the perpendicular position. This configuration makes it possible to cut a sheet along the conveyance direction at various cutting positions without providing a plurality of cutter blades in series along the conveyance direction of the sheet. Therefore, it is possible to prevent the sheet cutting apparatus from increasing in size. Further, the need to exchange the members for cutting a sheet in accordance with the necessary cutting position is eliminated. Furthermore, it is possible to suppress a decrease in productivity as it is possible to prevent the transition time between the retracted state and the cutting state of each cutter blade from becoming long.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-193757, filed Nov. 20, 2020 which is hereby incorporated by reference herein in its entirety.

What is claimed is:

1. A sheet cutting apparatus comprising:
a conveyance unit configured to convey a sheet in a conveyance direction;
a first cutting blade configured to cut the sheet along the conveyance direction of the sheet;
a second cutting blade configured to cut the sheet along the conveyance direction of the sheet, and arranged on one side of the first cutting blade in a widthwise direction that is perpendicular to both (a) the conveyance direction and (b) a perpendicular direction perpendicular to a surface of the sheet;
a third cutting blade configured to cut the sheet along the conveyance direction of the sheet, and arranged on another side of the first cutting blade in the widthwise direction;
a first moving unit configured to move the first cutting blade in the widthwise direction, the first moving unit being configured not to be able to move, in the widthwise direction, the first cutting blade to a position where the sheet does not pass;
a second moving unit configured to be able to move, in the widthwise direction, the second cutting blade to (a) a second cutting position where the sheet is cut and (b) a second retracted position where the sheet does not pass;
a third moving unit configured to be able to move, in the widthwise direction, the third cutting blade to (a) a third cutting position where the sheet is cut and (b) a third retracted position where the sheet does not pass; and
a control unit configured to control the first moving unit, the second moving unit, and the third moving unit,
wherein the first cutting blade is configured to be able to change a position in the perpendicular direction,
wherein the control unit is configured to position the first cutting blade at a first cutting position where the sheet is cut by the first cutting blade when the first cutting blade cuts the sheet, and to position the first cutting blade at a first retracted position where the sheet is not cut by the first cutting blade when the first cutting blade does not cut the sheet, the first retracted position being within a region where the sheet passes in the widthwise direction,
wherein the control unit is configured to position the second cutting blade at the second cutting position where the sheet is cut by the second cutting blade when the second cutting blade cuts the sheet, and to position the second cutting blade at the second retracted position when the second cutting blade does not cut the sheet, and
wherein the control unit is configured to position the third cutting blade at the third cutting position where the sheet is cut by the third cutting blade when the third cutting blade cuts the sheet, and to position the third cutting blade at the third retracted position when the third cutting blade does not cut the sheet.

2. The sheet cutting apparatus according to claim 1, wherein in a case where the sheet that is not cut by the sheet cutting apparatus passes through the first cutting blade, the second cutting blade, and the third cutting blade, the control unit is configured to position the first cutting blade at the first retracted position, to position the second cutting blade at the second retracted position, and to position the third cutting blade at the third retracted position, wherein the first cutting position is between the second cutting position and the third cutting position in the widthwise direction, and wherein the first retracted position is between the second retracted position and the third retracted position in the widthwise direction.

3. The sheet cutting apparatus according to claim 1, further comprising a fourth cutting blade configured to cut the sheet along the widthwise direction.

4. The sheet cutting apparatus according to claim 1, further comprising a skew correction unit configured to correct skew of the sheet before the sheet is cut.

5. An image formation system comprising:

a conveyance unit configured to convey a sheet in a conveyance direction;

an image formation apparatus configured to form an image onto the sheet; and a cutting apparatus configured to cut the sheet on which the image is formed by the image formation apparatus, the cutting apparatus including:

(1) a first cutting blade configured to cut the sheet along the conveyance direction of the sheet;

(2) a second cutting blade configured to cut the sheet along the conveyance direction of the sheet, and arranged on one side of the first cutting blade in a widthwise direction that is perpendicular to both (a) the conveyance direction and (b) a perpendicular direction perpendicular to a surface of the sheet;

(3) a third cutting blade configured to cut the sheet along the conveyance direction of the sheet, and arranged on another side of the first cutting blade in the widthwise direction;

(4) a first moving unit configured to move the first cutting blade in the widthwise direction, the first moving unit being configured not to be able to move, in the widthwise direction, the first cutting blade to a position where the sheet does not pass;

(5) a second moving unit configured to be able to move, in the widthwise direction, the second cutting blade to (a) a second cutting position where the sheet is cut and (b) a second retracted position where the sheet does not pass;

(6) a third moving unit configured to be able to move, in the widthwise direction, the third cutting blade to (a) a third cutting position where the sheet is cut and (b) a third retracted position where the sheet does not pass; and (7) a control unit configured to control the first moving unit, the second moving unit, and the third moving unit, wherein the first cutting blade is configured to be able to change a position in the perpendicular direction, wherein the control unit is configured to position the first cutting blade at a first cutting position where the sheet is cut by the first cutting blade when the first cutting blade cuts the sheet, and to position the first cutting blade at a first retracted position where the sheet is not cut by the first cutting blade when the first cutting blade does not cut the sheet, the first retracted position being within a region where the sheet passes in the widthwise direction, wherein the control unit is configured to position the second cutting blade at the second cutting position where the sheet is cut by the second cutting blade when the second cutting blade cuts the sheet, and to position the second cutting blade at the second retracted position when the second cutting blade does not cut the sheet, and wherein the control unit is configured to position the third cutting blade at the third cutting position where the sheet is cut by the third cutting blade when the third cutting blade cuts the sheet, and to position the third cutting blade at the third retracted position when the third cutting blade does not cut the sheet.

6. The image formation system according to claim 5, further comprising a post-processing apparatus configured to process the sheet that has passed through the cutting apparatus, wherein the cutting apparatus is arranged between the image formation apparatus and the post-processing apparatus in a horizontal direction.

7. A sheet cutting apparatus comprising:

a conveyance unit configured to convey a sheet;

a first cutting blade configured to cut the sheet along a conveyance direction of the sheet;

a second cutting blade configured to cut the sheet along the conveyance direction of the sheet, and arranged on one side of the first cutting blade in a widthwise direction that is perpendicular to both (a) the conveyance direction and (b) a perpendicular direction perpendicular to a surface of the sheet;

a third cutting blade configured to cut the sheet along the conveyance direction of the sheet, and arranged on another side of the first cutting blade in the widthwise direction;

a first moving unit configured to move the first cutting blade in the widthwise direction;

a second moving unit configured to move, in the widthwise direction, the second cutting blade within a first movable region including a first region where the sheet passes and a second region where the sheet does not pass;

a third moving unit configured to move, in the widthwise direction, the third cutting blade within a second movable region including a third region where the sheet passes and a fourth region where the sheet does not pass; and a control unit configured to control the first moving unit, the second moving unit, and the third moving unit, wherein the first moving unit is configured not to be able to move the first cutting blade to the second region and the fourth region, wherein the first cutting blade is configured to be able to change a position in the perpendicular direction, wherein the control unit is configured to position the first cutting blade at a first cutting position where the sheet is cut by the first cutting blade when the first cutting blade cuts the sheet, and to position the first cutting blade at a first retracted position where the sheet is not cut when the first cutting blade does not cut the sheet, the first retracted position being different in the perpendicular direction from the first cutting position, wherein the control unit is configured to position the second cutting blade at a second cutting position in the first region when the second cutting blade cuts the sheet, and to position the second cutting blade at a second retracted position in the second region when the second cutting blade does not cut the sheet, and wherein the control unit is configured to position the third cutting blade at a third cutting position in the third region when the third cutting blade cuts the sheet, and to position the third cutting blade at a third retracted position in the fourth region when the third cutting blade does not cut the sheet.

8. The sheet cutting apparatus according to claim 7, further comprising a fourth cutting blade configured to cut the sheet along the widthwise direction.

9. The sheet cutting apparatus according to claim 7, further comprising a skew correction unit configured to correct skew of the sheet before the sheet is cut.

* * * * *